(12) United States Patent
Kuhn

(10) Patent No.: US 7,154,201 B2
(45) Date of Patent: Dec. 26, 2006

(54) ELECTRICAL MACHINE WITH COOLING SYSTEM

(75) Inventor: Harald Kuhn, Frammersbach (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/941,031

(22) Filed: Sep. 14, 2004

(65) Prior Publication Data

US 2005/0093385 A1 May 5, 2005

(30) Foreign Application Priority Data

Sep. 15, 2003 (DE) .............................. 103 42 791

(51) Int. Cl.
*H02K 9/00* (2006.01)
(52) U.S. Cl. .......................................... 310/58; 310/90
(58) Field of Classification Search ................... 310/90, 310/52–59

See application file for complete search history.

(56) References Cited

U.S. PATENT DOCUMENTS

| 3,017,072 A | * | 1/1962 | Hagg et al. | ..................... 310/61 |
| 4,644,202 A | * | 2/1987 | Kroy et al. | .................... 310/58 |
| 4,725,198 A | * | 2/1988 | Fraser | ......................... 415/110 |
| 5,796,173 A | * | 8/1998 | Selfors et al. | ................ 290/52 |

* cited by examiner

*Primary Examiner*—Thanh Lam
(74) *Attorney, Agent, or Firm*—The Webb Law Firm

(57) ABSTRACT

An electrical machine (1) has a rotor (3) and a stator (2). The rotor (3) is actively connected with a rotor shaft (4), which is rotationally mounted in a housing (7) by means of at least one bearing (5), in particular a roller bearing. The electrical machine has an efficient cooling system that is easy and economical to construct by locating the bearing (5) in a bearing end plate (6). The bearing end plate (6) is provided with at least one coolant space (15; 17; 23) that carries a coolant flow.

17 Claims, 4 Drawing Sheets

ELECTRICAL MACHINE WITH COOLING SYSTEM

CROSS REFERENCE TO RELATED APPLICATION

This application claims priority to German Application No. 103 42 791.0 filed Sep. 15, 2003, which is herein incorporated by reference in its entirety.

BACKGROUND OF THE INVENTION

1. Field of the Invention

This invention relates to an electrical machine with a rotor and a stator. The rotor is effectively connected with a rotor shaft that is rotationally mounted in a housing by means of at least one bearing, such as a roller bearing.

2. Technical Considerations

Electrical machines are known in the form of direct-current machines or three-phase machines (asynchronous or synchronous machines). For cooling direct-current motors, an air cooling system is frequently provided in which a fan impeller driven by the rotor shaft generates an air current through the housing of the machine.

Three-phase machines generally have a closed housing and a small air gap between the stator and the rotor. This means that it is practically impossible to cool these machines with air. On three-phase machines of the known art, the housing is closed for maintenance reasons and is provided with fins on the outside to discharge heat.

As the power of electrical machines increases, such cooling systems are no longer able to discharge a sufficient amount of heat.

This problem is present to a particular degree with drive axles in which one or more electrical machines are installed. As a result of which, the electrical machines reach high steady-state temperatures. In work machines realized in the form of industrial trucks that are operated in multiple-shift operations, for example, thermal overloads can occur in the problem zones in the vicinity of the bearings and the sealing devices of the electrical machines. This can lead to the failure of the sealing devices or of the bearings.

In comparison to air cooling systems, liquid cooling systems are significantly more efficient and make it possible to discharge a large amount of heat. So, to achieve the same power output, the size of the electrical machine can be reduced, or for an electrical machine of the same size, the power output can be increased.

On three-phase machines, liquid cooling systems are known in which a system of tubes to cool the stator is located on the outer jacket. However, an external cooling system to cool the entire three-phase machine is difficult and expensive to construct.

Electrical machines with an internal liquid cooling system are also known in which the rotor runs under oil, although that causes increased splash losses.

A high cooling capacity is also required in such internal and external liquid cooling systems because the entire electrical machine must be cooled, which increases the complexity and expense of construction.

Therefore, it is an object of the invention to provide an electrical machine of the general type described above but which makes possible an efficient cooling and is easy and economical to construct.

SUMMARY OF THE INVENTION

The invention teaches that the above object can be accomplished by locating a bearing in a bearing end plate, wherein the bearing end plate is provided with a coolant space that guides at least one coolant.

The invention, therefore, teaches that there is a partial and targeted cooling of the electrical machine in the problem areas in the vicinity of the bearing end plate and, thus, of the bearings where the highest temperatures occur and where the endangered components are located. As a result of the partial cooling of the electrical machine on the bearing end plate and thus in the vicinity of the bearings, the required cooling capacity can be significantly reduced compared to a liquid cooling of the entire electrical machine. As a result of the location of the liquid cooling system in the bearing end plate in the form of a closed coolant space in the bearing end plate, which coolant space can be located directly or indirectly on the bearing, the result is a liquid cooling of the electrical machine with an efficient cooling of the endangered components with a lower cooling capacity and a lower construction expense.

In one embodiment of the invention, the coolant space can be in the bearing end plate in the area axially next to the bearing. The construction can be made easier and more economical if the coolant space is in direct communication with the bearing. In this exemplary embodiment, a cooling of the rotor shaft can also be achieved.

A partial cooling of the bearing can also be achieved if, as in an additional exemplary embodiment of the invention, the coolant space is in the bearing end plate in the area radially next to the bearing. In this case, a particularly simple construction is possible because, as a result of the location of the coolant space in the bearing end plate, no rotating seal of the coolant space on the rotor shaft is necessary. With a coolant space of this type, it is also possible to discharge heat from the electrical machine as well as from an accessory device, for example from a transmission that is driven by the rotor, by means of the front surfaces of the coolant space.

It is particularly advantageous if the coolant space that is in the area axially next to the bearing is in communication with the coolant space that is in the area radially next to the bearing.

In one advantageous embodiment of the invention, the bearing is sealed toward the outside by a sealing device located in the bearing end plate, such as a rotary shaft seal, whereby the coolant space in the bearing end plate is located between the bearing and the sealing device. The coolant space provided with the coolant is thereby located axially directly next to the bearing and is in direct communication with the bearing. Thus, a reliable cooling of the bearing and of the sealing device and thus of the endangered components of the electrical machine can be achieved. The sealing device, which is already present, reliably prevents the loss of the coolant. A coolant space of this type can be realized with little construction expense or effort on the housing boring of the bearing end plate that holds the bearing, for example in the form of an annulus.

The coolant can thereby flow over the bearing into the interior of the electrical machine and can be returned into a cooling circuit.

The bearing can be advantageously sealed with respect to the inside by means of a sealing device, such as a rotary shaft seal, which can be located on the bearing end plate. The coolant space can be realized in the bearing end plate between the bearing and the sealing device. An outflow of coolant into the interior of the electrical machine and the related splash losses can thus be avoided, whereby a reliable cooling of the sealing device can be achieved by means of the coolant space.

It is particularly advantageous if the coolant spaces that are realized between the bearing and the sealing device are in flow communication with each other, for example by means of the bearing.

The sealing device can be advantageously located in a seal shield that is fastened to the bearing end plate.

In one advantageous embodiment of the invention, the coolant space is realized between the bearing end plate and the seal shield. With a corresponding realization of the seal shield, it thereby becomes possible to easily create a coolant space that is located in the radial area of the bearing on the front surface of the bearing end plate. As a result of which, it becomes possible to cool the bearing, the sealing device, the rotor shaft and an accessory unit, such as a transmission for example, which can be located next to the bearing end plate.

The coolant space can advantageously extend in the radial direction via the front surface of the bearing end plate to the bearing. Therefore, an enclosed coolant space can be created on the bearing end plate that extends over the front surface of the bearing end plate and is in direct communication with the bearing, for example an annular space between the bearing and the sealing device and thus a coolant space that is realized between the bearing and the sealing device.

In one preferred embodiment of the invention, the coolant space can be located between the bearing end plate and a cover shield fastened to the bearing end plate. It thereby becomes possible to easily and economically produce a closed and radially oriented coolant space that is in indirect communication with the bearing. As a result of which, no rotating seal of the coolant space with respect to the rotor shaft is necessary.

The coolant space can advantageously extend in the radial direction over the front surface of the bearing end plate to a bearing shoulder of the bearing end plate that supports the bearing. On the bearing end plate there is thus an enclosed ring-shaped coolant space, which makes possible a cooling of the interior of the electrical machine and of the accessory device and, via the inner radial area, a cooling of the bearing and of the sealing device. The coolant space can thereby be closed in a simple manner with the cover shield on the bearing shoulder.

In another preferred development of the invention, the coolant space is provided for the cooling of a neighboring stator end winding.

The stator end winding that is next to the bearing end plate can be easily cooled if the seal shield or the cover shield extends at least partly, for example in the axial direction, into the vicinity of the stator end winding.

A low additional construction expense for the cooling of the stator end winding can be achieved if the seal shield or the cover shield is provided with a widened portion that extends to the stator end winding, which forms a coolant annulus that is located in the vicinity of the stator end winding. With such a widened portion that extends to the stator end winding in the axial direction, it is easily possible to create on the inner periphery of the stator end winding a coolant annulus for the cooling of the stator end winding.

It is particularly advantageous if the coolant chamber is connected to a coolant circuit, whereby the coolant chamber is in communication with a feed connection and/or a drain connection.

The feed connection and/or the drain connection can be easily placed in communication with the coolant chamber if the feed connection and/or the drain connection is connected to a coolant channel that is in the bearing end plate and that leads to the coolant chamber.

If, as in one advantageous development of the invention, next to the bearing end plate there is an accessory device, such as a transmission, that is driven by the rotor, it is easily possible to achieve a cooling of the accessory device by means of the coolant chamber that is located in the bearing end plate.

BRIEF DESCRIPTION OF THE DRAWINGS

Additional advantages and details of the invention are described in greater detail below with reference to the exemplary embodiments that are illustrated in the accompanying schematic figures, in which.

DESCRIPTION OF THE PREFERRED EMBODIMENTS

Figure 1:
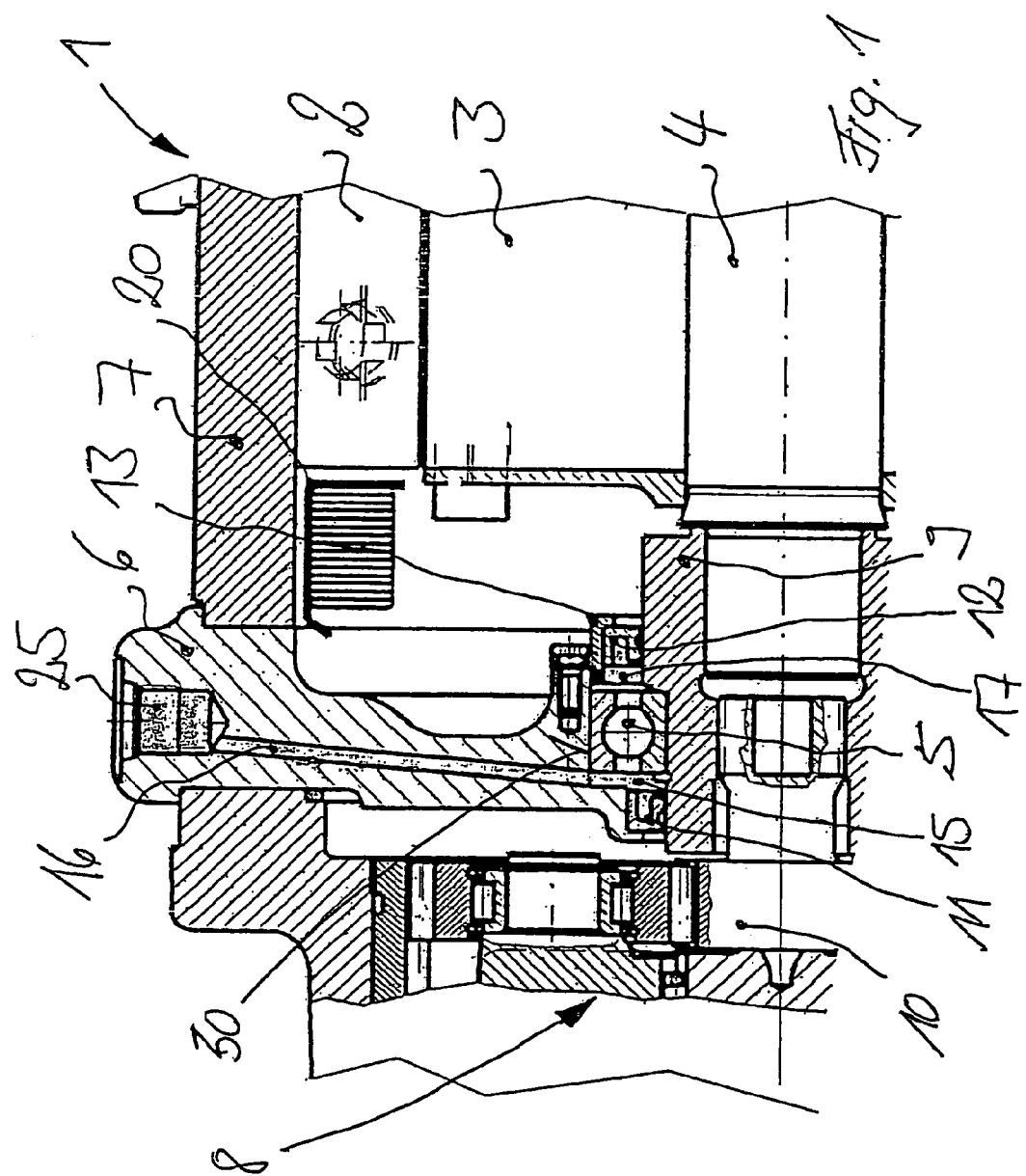
FIG. 1 is a longitudinal section through a first exemplary embodiment of an electrical machine incorporating features of the invention.

The electrical machine 1 illustrated in FIG. 1 has a stator 2 and a rotor 3 that is fastened to a rotor shaft 4. The rotor shaft 4 is supported at both ends by a bearing realized in the form of a roller bearing, of which only the left bearing 5 is illustrated in FIG. 1. The bearing 5 is located in a bearing end plate 6. The bearing end plate 6 is thereby fastened to a housing 7, for example an axle housing. Located on the side of the bearing end plate 6 opposite the electrical machine 1, there is an accessory device 8, for example a transmission to drive a wheel of a work machine, such as an industrial truck for example. The accessory device 8 is driven by the rotor shaft 4. The rotor shaft 4 is thereby in connection with an intermediate piece 9 that is provided to drive an input element 10 of the accessory device 8.

The bearing 5 is sealed toward the outside and with respect to the accessory device 8 by means of a sealing device realized in the form of a rotary shaft seal 11. In this case, the sealing device 11 is located in the bearing end plate 6.

The invention teaches that between the bearing 5 and sealing device 11, in the vicinity of the external front surface of the bearing 5 and thus in the area axially next to the bearing 5, a ring-shaped coolant space 15 can be realized in the bearing end plate 6. The coolant space 15 is connected to a coolant circuit and, for this purpose, is in communication with a coolant channel 16 in the bearing end plate 6 having a feed connection 25, and a coolant channel (not shown in any greater detail) that is in communication with a drain connection.

Toward the inside direction of the electrical machine 1, the bearing 5 is sealed by means of a sealing device 12 that is located on the bearing end plate 6. The sealing device 12 is located in a seal shield 13 fastened to the bearing end plate 6 in the radially inner area.

Between the inner front surface of the bearing 5 and the sealing device 12 (and thus in the area that is axially next to the bearing 5), there can be an additional (second) ring-shaped coolant space 17 that is in communication with the coolant space 15 via the bearing 5.

The coolant spaces 15, 17 are provided on a housing boring 30 of the bearing end plate 6 that holds the bearing 5. As a result of which, the coolant spaces 15, 17 can be created without additional manufacturing effort or expense.

With the coolant spaces 15, 17 in the bearing end plate 6, the bearing 5 and the sealing device 11, as well as the sealing device 12 and, thus, the endangered components of the electrical machine, can be cooled with little construction effort or expense and with a low cooling capacity.

Figure 2:
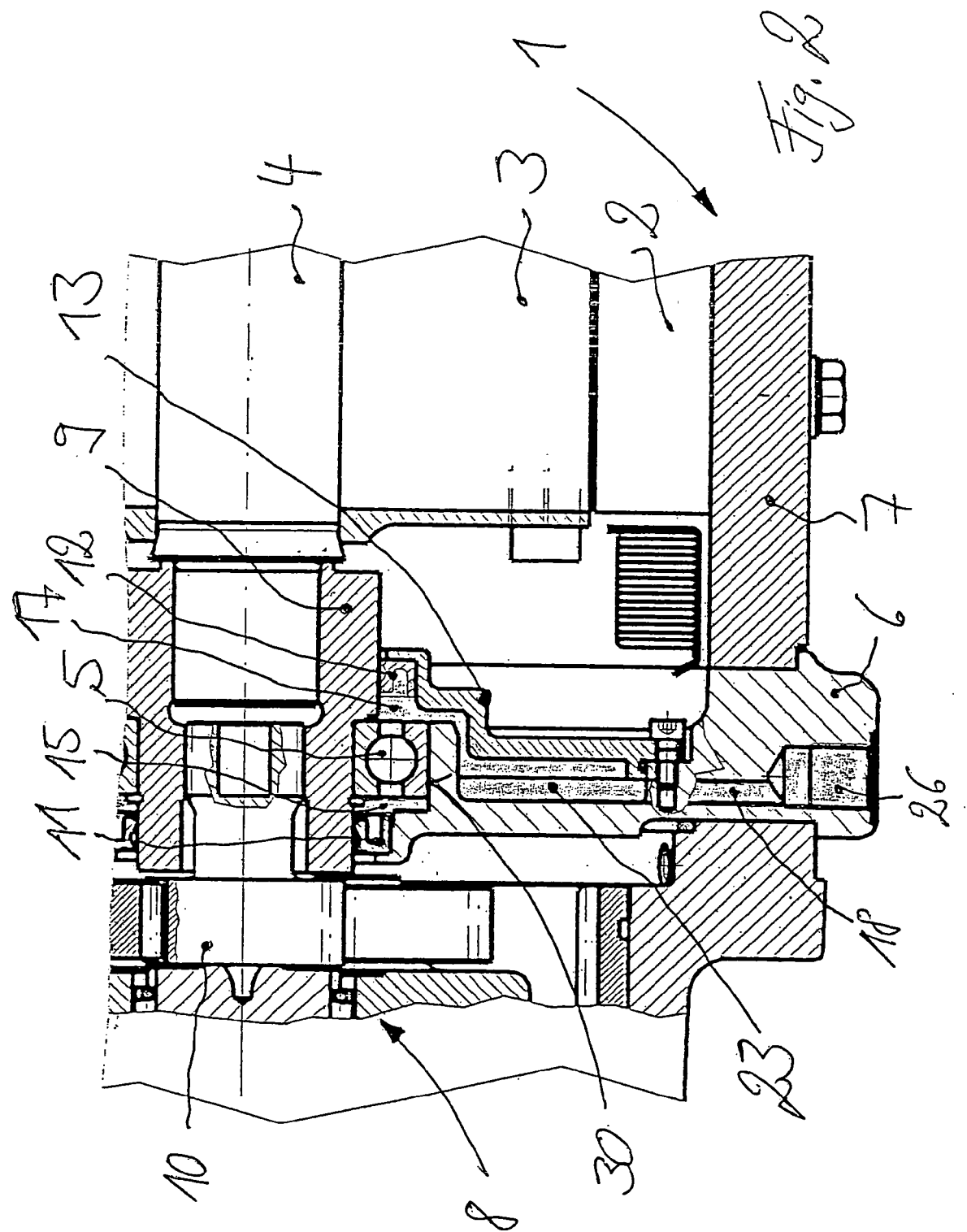
FIG. 2 is a longitudinal section through an additional embodiment of an electrical machine of the invention.

As shown in FIG. 2, between the seal shield 13 (that supports the sealing device 12 and is fastened to the radially outer area of the bearing end plate 6) and the bearing end plate 6 there can be a further (third) coolant space 23 that is located in the area radially next to the bearing 5. The coolant space 23 is in communication with a drain connection 26 by means of a coolant channel 18 that is in the bearing end plate 6, and in a manner not shown in any further detail with a feed connection. The coolant space 23 thereby extends through the configuration of the seal shield 13 in the radial direction via the front surface of the bearing end plate 6 to the inner front surface of the bearing 5 facing the sealing device 12. As a result of which, the coolant space 23 is in communication with the coolant space 17 which is positioned between the bearing 5 and the sealing device 12. By means of the bearing 5, the coolant space 15 on the housing boring 30 between the bearing 5 and the sealing device 11 is in communication with the coolant space 17.

The coolant spaces 15, 17, 23 illustrated in FIG. 2 make possible, in addition to a cooling of the bearing 5 and of the sealing devices 11, 12, by means of the intermediate piece 9 a cooling of the rotor shaft 4, and by means of the front surface of the bearing end plate 6 a cooling of the accessory device 8, and by means of the front surface of the seal shield 13 a cooling of the electrical machine 1 with a low cooling capacity.

Figure 3:
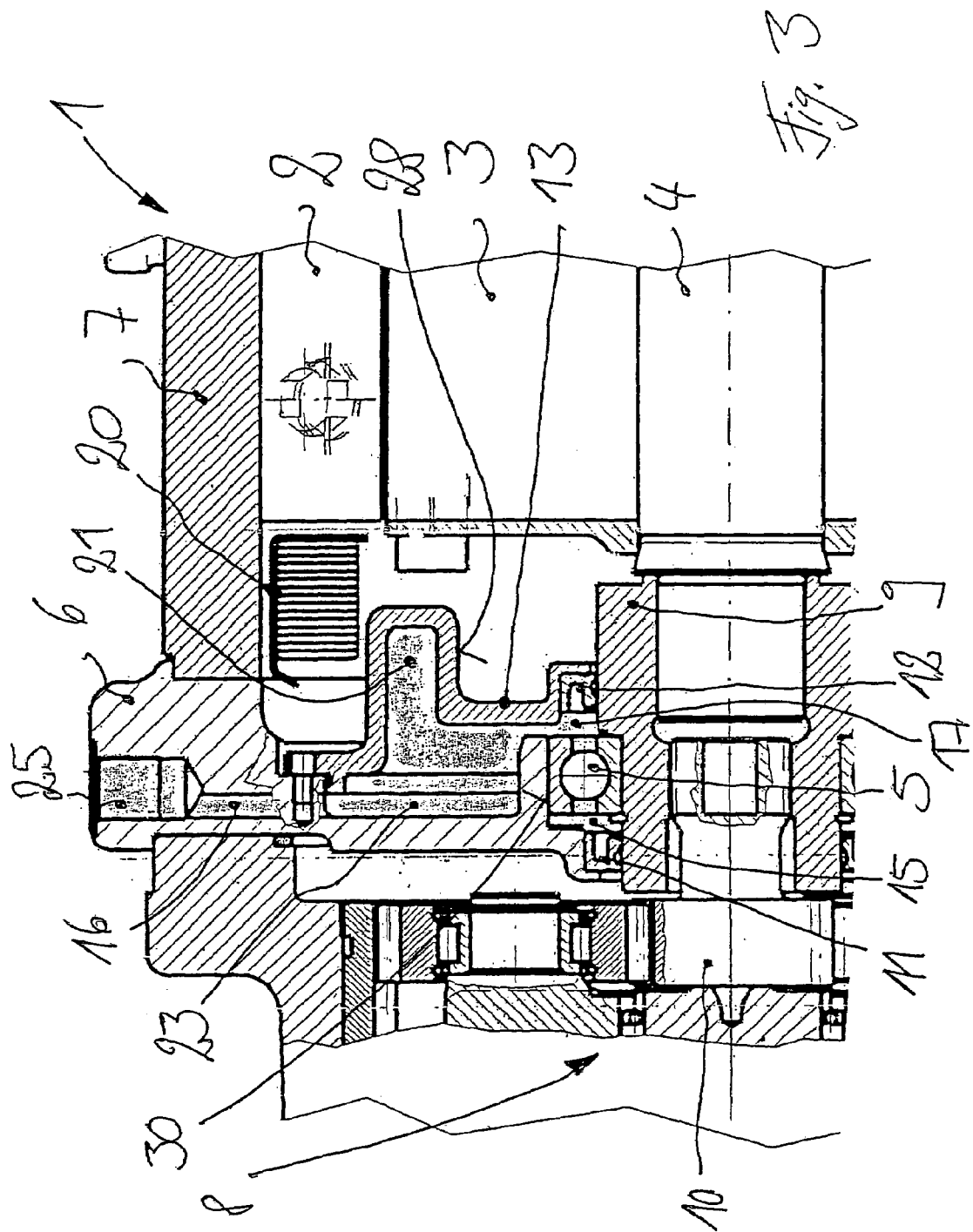
FIG. 3 is a modification of FIG. 2.

In the embodiment illustrated in FIG. 3, there is also a cooling of a stator end winding 20. For this purpose, the seal shield 13 is provided with a widened portion 28 that extends in the axial direction toward the stator end winding 20. The stator end winding 20 at least partly overlaps the inside periphery. The widened portion 28 of the seal shield 13 can be realized in the form of a ring-shaped groove, for example, as a result of which a coolant annulus 21 is formed in the vicinity of the stator end winding 20, which is in communication with the coolant space 23.

Figure 4:
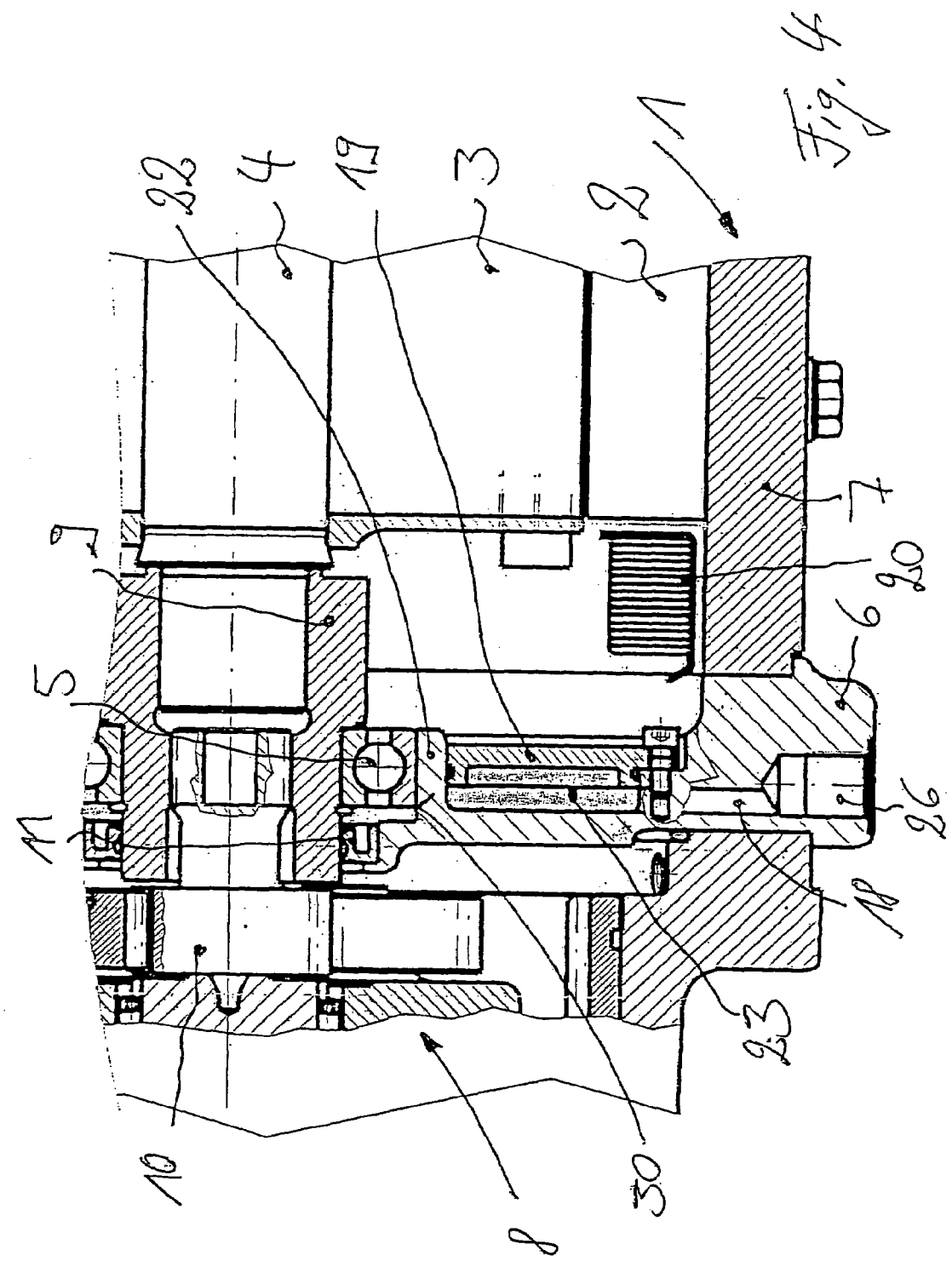
FIG. 4 is a longitudinal section through an additional exemplary embodiment of an electrical machine of the invention.

As shown in FIG. 4, the coolant space 23 is located in the area radially next to the bearing 5 and is realized between the bearing end plate 6 and a cover shield 19, which is fastened to the bearing end plate 6 and is in communication in the radially inner area with a bearing shoulder 22 of the bearing end plate 6 which supports the bearing 5. The ring-shaped coolant space 23 therefore extends in the radial direction over the front surface of the bearing end plate 6 to the outside periphery of the bearing shoulder 22 of the bearing end plate 6 that supports the bearing 5. As a result of which, the enclosed coolant space 23 is in indirect communication with the bearing 5 and the sealing device 11. In this exemplary embodiment, a cooling of the bearing 5 and of the sealing device 11 is possible, as well as, via the front surface of the bearing end plate 6, a cooling of the accessory device 8, and via the front surface of the cover shield 19 a cooling of the electrical machine 1. As a result of the location of the cover shield 19 on the bearing shoulder 22 of the bearing end plate 6, no rotating sealing device is required to seal the coolant space 23 with respect to the rotor shaft 4 and the intermediate piece 9, as a result of which the effort and expense of construction can be reduced.

The cover shield 19 illustrated in FIG. 4 can be provided with a widened portion as shown in FIG. 3 for the additional cooling of the stator end winding 20.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An electrical machine, comprising:
   a rotor;
   a stator having an end winding; and
   at least one bearing,
   wherein the rotor is effectively connected with a rotor shaft rotationally mounted in a housing by means of the at least one bearing,
   wherein the bearing is located in a bearing end plate,
   wherein a seal shield or a cover shield forms an enclosed coolant space that extends from the bearing end plate at least partly into the vicinity of the stator end winding,
   wherein the seal shield or the cover shield is provided with a widened portion that extends to the stator end winding and forms an enclosed coolant annulus that is located in the vicinity of the stator end winding, with the stator end winding at least partly overlapping an inside periphery of the coolant annulus,
   wherein the bearing end plate includes at least one coolant space that transports a coolant flow, and
   wherein liquid coolant flows through the enclosed coolant annulus and does not directly contact the stator end winding.

2. The electrical machine as claimed in claim 1, wherein the coolant space is located in the bearing end plate in an area axially next to the bearing.

3. The electrical machine as claimed in claim 1, wherein the coolant space is located in the bearing end plate in an area radially next to the bearing.

4. The electrical machine as claimed in claim 1, comprising a coolant space located in an area axially next to the bearing in communication with another coolant space that is located in an area radially next to the bearing.

5. The electrical machine as claimed in claim 1, wherein the bearing is sealed toward an outside by an outside sealing device, and wherein the coolant space is provided in the bearing end plate between the bearing and the outside sealing device.

6. The electrical machine as claimed in claim 1, wherein the bearing is sealed toward an inside by an inside sealing device, and wherein the coolant space is provided in the bearing end plate between the bearing and the inside sealing device.

7. The electrical machine as claimed in claim 2, wherein the coolant space comprises a first coolant space and a second coolant space, wherein the first coolant space is in communication with the second coolant space.

8. The electrical machine as claimed in claim 6, wherein the inside sealing device is located in a seal shield fastened to the bearing end plate.

9. The electrical machine as claimed claim 3, wherein the coolant space is provided between the bearing end plate and a seal shield.

10. The electrical machine as claimed in claim 3, wherein the coolant space extends in a radial direction over a front surface of the bearing end plate to the bearing.

11. The electrical machine as claimed claim 3, wherein the coolant space extends in the radial direction over the front surface of the bearing end plate to a bearing shoulder of the bearing end plate that supports the bearing.

12. The electrical machine as claimed in claim 1, wherein the coolant space is connected to a coolant circuit, whereby the coolant space is in communication with a feed connection and/or a drain connection for the coolant.

13. The electrical machine as claimed in claim 12, wherein at least one of the feed connection and the drain connection is in communication with a coolant channel in the bearing end plate.

14. The electrical machine as claimed in claim 1, including an accessory device driven by the rotor and located next to the bearing end plate.

15. The electrical machine as claimed in claim 1, wherein the bearing is a roller bearing.

16. The electrical machine as claimed in claim 5, wherein the sealing device comprises a rotary shaft seal located in the bearing end plate.

17. The electrical machine as claimed in claim 14, wherein the accessory device is a transmission.

* * * * *